United States Patent
Jeong et al.

(10) Patent No.: US 10,970,208 B2
(45) Date of Patent: Apr. 6, 2021

(54) MEMORY SYSTEM AND OPERATING METHOD THEREOF

(71) Applicant: SK hynix Inc., Gyeonggi-do (KR)

(72) Inventors: Seung-Gyu Jeong, Gyeonggi-do (KR); Su-Hae Woo, Gyeonggi-do (KR); Chang-Soo Ha, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 216 days.

(21) Appl. No.: 16/232,248

(22) Filed: Dec. 26, 2018

(65) Prior Publication Data
US 2020/0012601 A1     Jan. 9, 2020

(30) Foreign Application Priority Data
Jul. 3, 2018  (KR) .................. 10-2018-0077176

(51) Int. Cl.
*G06F 12/0802* (2016.01)
*G06F 3/06* (2006.01)

(52) U.S. Cl.
CPC ........ *G06F 12/0802* (2013.01); *G06F 3/0604* (2013.01); *G06F 3/0638* (2013.01); *G06F 3/0679* (2013.01); *G06F 2212/70* (2013.01)

(58) Field of Classification Search
CPC .. G06F 12/0802; G06F 3/0604; G06F 3/0638; G06F 3/0679
See application file for complete search history.

(56) References Cited

U.S. PATENT DOCUMENTS

| | | | | |
|---|---|---|---|---|
| 6,298,418 B1* | 10/2001 | Fujiwara | ............. | G06F 12/0833 711/144 |
| 2012/0246410 A1 | 9/2012 | Xu | | |
| 2015/0026411 A1* | 1/2015 | Lippert | ............... | G06F 12/0833 711/135 |
| 2016/0055095 A1* | 2/2016 | Faraboschi | ............. | G06F 3/061 711/118 |

FOREIGN PATENT DOCUMENTS

KR     1020130017813     2/2013

OTHER PUBLICATIONS

Cooperman, Gene. Cache Basics by Gene Cooperman, 2003 (Year: 2003).*

* cited by examiner

*Primary Examiner* — Ryan Bertram
*Assistant Examiner* — Edmund H Kwong
(74) *Attorney, Agent, or Firm* — IP & T Group LLP

(57) ABSTRACT

A memory system includes a memory device including a main memory and a cache memory that includes a plurality of cache lines for caching data stored in the main memory, wherein each of the cache lines includes cache data, a valid bit indicating whether or not the corresponding cache data is valid, and a loading bit indicating whether or not read data of the main memory is being loaded; and a memory controller suitable for scheduling an operation of the memory device with reference to the valid bits and the loading bits.

23 Claims, 5 Drawing Sheets

MEMORY SYSTEM AND OPERATING METHOD THEREOF

CROSS-REFERENCE TO RELATED APPLICATION

This application claims priority under 35 U.S.C. § 119(a) to Korean Patent Application No. 10-2018-0077176, filed on Jul. 3, 2018, in the Korean Intellectual Property Office, the disclosure of which is incorporated herein by reference in its entirety.

BACKGROUND

1. Field

Various embodiments relate to a semiconductor design technique, and more particularly, to a hybrid memory system including a volatile memory device and a nonvolatile memory device.

2. Description of the Related Art

There is a limitation in the use of a volatile memory as a main memory in a large-capacity memory system in that it has high power consumption. Such memory also has a limit in terms of the degree of integration. For example, the volatile memory includes a dynamic random access memory (DRAM).

Recently, a nonvolatile memory has been actively developed to overcome the limitations of high power consumption and degree of integration in the above-described volatile memory. Examples of the nonvolatile memory include a Phase Change Random Access Memory (PCRAM), a Magnetic RAM (MRAM), a Ferroelectric RAM (FRAM), a Resistive RAM (RRAM), and a Spin-Torque Transfer RAM (STT_RAM). The nonvolatile memory does not need to consume energy to retain data stored therein. Thus, the nonvolatile memory has a higher degree of integration and consumes less power than a volatile memory. However, the nonvolatile memory has lower performance (e.g., lower read/write speeds) and write endurance than the volatile memory.

Recently, there has been proposed a hybrid memory system which makes use of the advantages of both types of memories. The hybrid memory system can use the nonvolatile memory as a main memory and the volatile memory as a cache memory. While use of the nonvolatile memory as the main memory can lower the unit cost, such use may increase latency. If a response to a read request is unduly delayed due to the increased latency of the main memory, the read request may not be properly handled.

SUMMARY

Various embodiments are directed to a memory system that uses a main memory having relatively long latency, and a method of managing data by using a loading bit indicating that read data of the main memory is being loaded into a cache memory.

In accordance with an embodiment, a memory system includes: a memory device including a main memory and a cache memory that includes a plurality of cache lines for caching data stored in the main memory, wherein each of the cache lines includes cache data, a valid bit indicating whether or not the corresponding cache data is valid, and a loading bit indicating whether or not read data of the main memory is being loaded; and a memory controller suitable for scheduling an operation of the memory device with reference to the valid bits and the loading bits.

In accordance with an embodiment, a memory system includes: a nonvolatile memory device; a volatile memory device including a plurality of cache lines for caching data stored in the nonvolatile memory device, wherein each of the cache lines includes cache data, a tag address, a valid bit indicating whether or not the corresponding cache data is valid, a dirty bit indicating whether there is a discrepancy between the corresponding cache data and the data of the nonvolatile memory device, and a loading bit indicating whether or not read data of the nonvolatile memory device is being loaded; and a memory controller suitable for scheduling an operation of the volatile memory device with reference to the valid bits, the dirty bits and the loading bits.

In accordance with an embodiment, an operating method of a memory system includes: providing a memory device including a main memory and a cache memory that includes a plurality of cache lines for caching data stored in the main memory, wherein each of the cache lines includes cache data, a valid bit indicating whether or not the corresponding cache data is valid, and a loading bit indicating whether or not read data of the main memory is being loaded; checking whether or not the loading bit of a cache line, which corresponds to an address of select data to be stored therein, is set when a read request is received from a host; and releasing the loading bit, setting the valid bit, and outputting the cache data of the cache-hit cache line after waiting until the read data is stored in the cache-hit cache line, when the loading bit is set.

In accordance with an embodiment, an operating method of a memory system includes: receiving an operation request; searching cache lines in a cache memory of the memory system for a cache-hit cache line having an address corresponding to an address of data associated with the operation request, wherein the cache lines are configured to cache data stored in a nonvolatile memory device of the memory system; determining, when a cache-hit cache line is found, whether or not a valid bit or a loading bit of the cache-hit cache line is set, and scheduling the requested operation based on a result of the determination; and searching for an empty cache line, among the cache lines, when a cache-hit cache line is not found, based on valid bits, dirty bits D and loading bits of the cache lines respectively.

DETAILED DESCRIPTION

Various embodiments will be described below in more detail with reference to the accompanying drawings. These embodiments are provided so that this disclosure is thorough and complete. All "embodiments" referred to in this disclosure refer to embodiments of the inventive concept disclosed herein. The embodiments presented are merely examples and are not intended to limit the scope of the disclosure. Also, throughout the specification, reference to "an embodiment" or the like is not necessarily to only one embodiment, and different references to any such phrase are not necessarily to the same embodiment(s).

Moreover, it is noted that the terminology used herein is for the purpose of describing the embodiments only and is not intended to be limiting of the invention. As used herein, singular forms are intended to include the plural forms and vice versa, unless the context clearly indicates otherwise. It will be further understood that the terms "comprises," "comprising," "includes" and/or "including" when used in this specification, indicate the presence of stated features, but do not preclude the presence or addition of one or more other non-stated features. As used herein, the term "and/or" indicates any and all combinations of one or more of the listed items. It is also noted that in this specification, "connected/coupled" refers to one component not only directly coupling another component but also indirectly coupling another component through an intermediate component. Communication between two elements, whether directly or indirectly connected/coupled, may be wired or wireless, unless the context indicates otherwise.

It will be understood that, although the terms "first", "second", "third", and so on may be used herein to identify various elements, these elements are not limited by these terms. These terms are used to distinguish one element from another element that otherwise have the same or similar names. Thus, a first element in one instance could be termed a second or third element in another instance without departing from the spirit and scope of the present disclosure.

The drawings are not necessarily to scale and, in some instances, proportions may have been exaggerated in order to clearly illustrate features of the embodiments.

Various embodiments will be described primarily in the context of a hybrid memory system using a nonvolatile memory as a main memory and a volatile memory as a cache memory. However, the present embodiments may be applied to other memory systems including a main memory and a cache memory.

Figure 1:
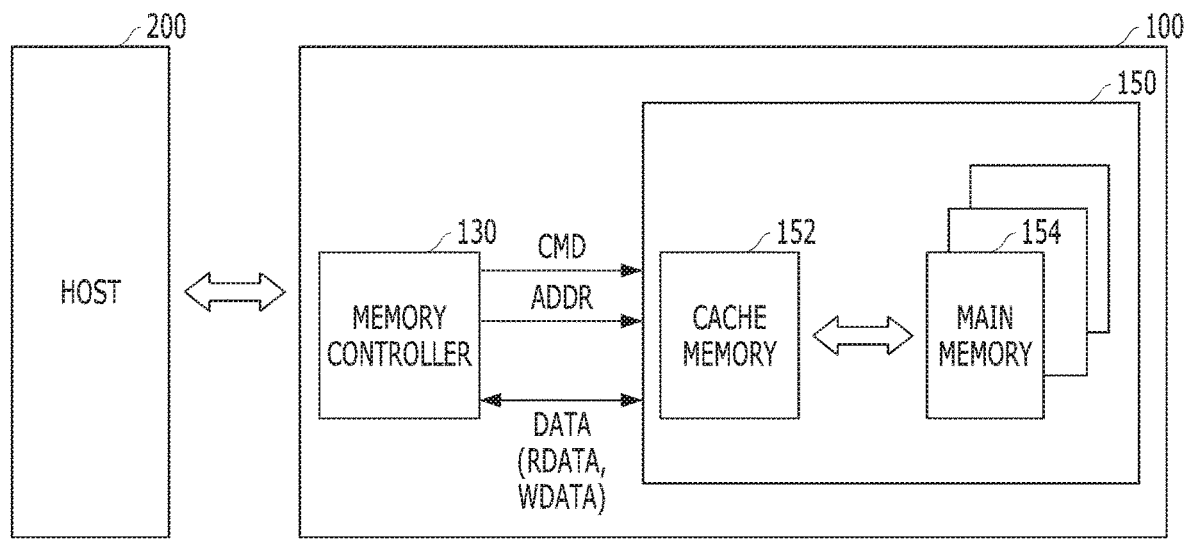
FIG. 1 is a block diagram illustrating a hybrid memory system in accordance with an embodiment of the present invention.
Figure 2:
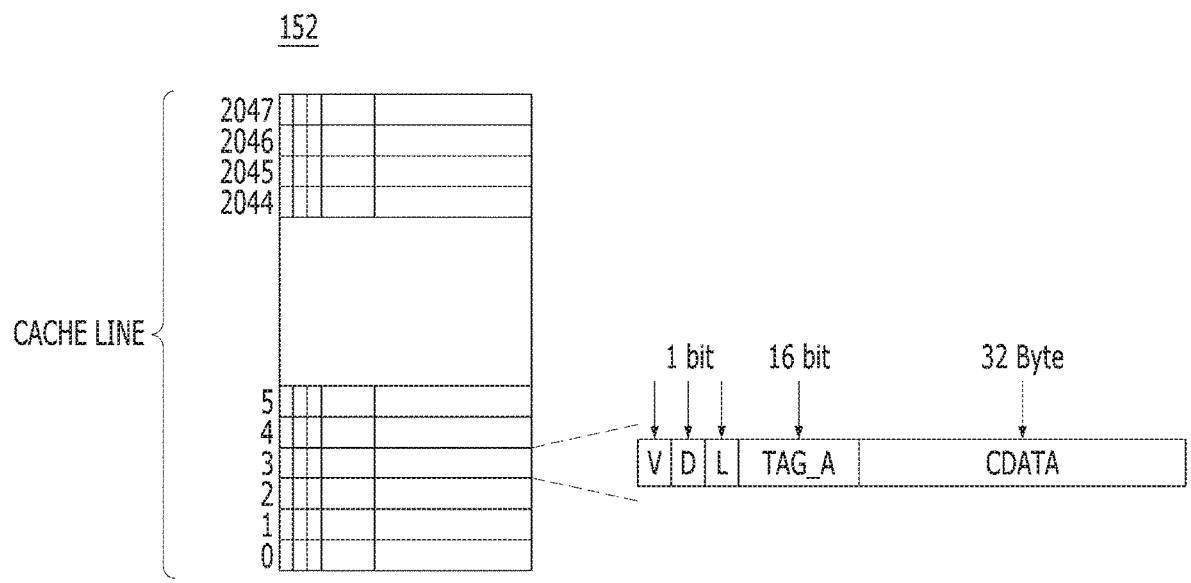
FIG. 2 is a diagram for describing a cache line of a cache memory shown in FIG. 1.

FIG. 1 is a block diagram illustrating a hybrid memory system 100 in accordance with an embodiment. FIG. 2 is a configuration diagram for describing a cache line of a cache memory 152 shown in FIG. 1.

Referring to FIG. 1, the hybrid memory system 100 may include a hybrid memory device 150 and a memory controller 130. The hybrid memory device 150 may store data accessed by a host 200. The memory controller 130 may control data storage to the hybrid memory device 150.

The memory controller 130 may provide a command CMD, an address ADDR and data DATA to the hybrid memory device 150 in response to a request from the host 200, and control read, write/program and erase operations of the hybrid memory device 150. For example, the memory controller 130 may provide read data RDATA, which is read from the hybrid memory device 150 during the read operation, to the host 200, and store write data WDATA, which is provided from the host 200 during the write operation, in the hybrid memory device 150.

The hybrid memory device 150 may receive the command CMD, the address ADDR and the data DATA from the memory controller 130. When the command CMD corresponding to a write command is inputted, the hybrid memory device 150 may write the write data WDATA to a memory region corresponding to the address ADDR. When the command CMD corresponding to a read command is inputted, the hybrid memory device 150 may read the read data RDATA from a memory region corresponding to the address ADDR, and transfer the read data RDATA to the memory controller 130.

The hybrid memory device 150 may include a main memory 154 and a cache memory 152 for caching data stored in the main memory 154. The main memory 154 may be implemented with a nonvolatile memory device. The nonvolatile memory device may include a Read Only Memory (ROM), a Mask ROM (MROM), a Programmable ROM (PROM), an Erasable Programmable ROM (EPROM), an Electrically Erasable Programmable ROM (EEPROM), a Ferroelectric RAM (FRAM), a Phase Change RAM (PCRAM), a Spin-Torque Transfer RAM (STT-RAM), a Resistive RAM (RRAM), and/or a flash memory. The cache memory 152 may include a dynamic random access memory (DRAM) and/or a static RAM (SRAM). In some embodiments, the main memory 154 may be implemented with a PCRAM, and the cache memory 152 may be implemented with a DRAM.

In general, a PCRAM has more scalability, but lower read/write operation speeds than a DRAM. Also, a PCRAM uses a larger amount of energy during a write operation, and has limited write durability. Thus, in some embodiments, the hybrid memory device 150 may use a low-speed nonvolatile memory device implemented with a PCRAM as the main memory 154, and use a high-speed volatile memory device implemented with a DRAM as the cache memory 152.

The cache memory 152 is a high-speed memory device that temporarily stores information between a processor having a relatively high processing speed, that is, the memory controller 130 and the main memory 154 having a relatively low processing speed. The hybrid memory system 100 may store data in the cache memory 152 before storing the data in the main memory 154, thereby reducing the number of merge operations or block erase operations. In other words, the hybrid memory system 100 may reduce the number of accesses to a low-speed memory device (e.g., a PCRAM) by storing data which are frequently accessed in a high-speed memory device (e.g., DRAM), thereby improving the performance of the overall hybrid memory system. Since the cache memory 152 has a limited space, the cache memory 152 needs to erase existing data when the cache memory 152 is full in order to load new data. For this operation, when the cache memory 152 is full, the cache memory 152 may erase data which are less likely to be accessed or write back the data to the main memory 154, and replace the data of the corresponding space with new data, according to a cache replacement policy.

Referring to FIG. 2, the cache memory 152 may include a plurality of cache lines for caching data stored in the main memory 154.

When a write request is inputted from the host 200, the memory controller 130 may determine which of the plurality of cache lines constituting the cache memory 152 are available, and store data for each of the cache lines when it is determined that the cache line is available. For example, the cache memory 152 including first to 2048$^{th}$ cache lines is illustrated in FIG. 2.

Each of the first to 2048$^{th}$ cache lines may include cache data CDATA, a tag address TAG_A, a valid bit V, a dirty bit D and a loading bit L. For example, 32-byte cache data CDATA, a 16-bit tag address TAG_A, a 1-bit valid bit V, a 1-bit dirty bit D and a 1-bit loading bit L are illustrated in FIG. 2. For reference, the first to 2048th cache lines may further include line indexes for distinguishing the respective cache lines.

The cache data CDATA may be write data stored in the main memory 154 or read data read from the main memory 154.

The tag address TAG_A may include address information that designates a storage location of the cache data CDATA.

The valid bit V may include information indicating whether or not the cache data CDATA stored in a corresponding cache line is valid. The valid bit V may be set to logic high value, e.g., "1", when the cache data CDATA is valid.

For the purpose of the following discussion, any bit having a logic high value is considered as being set, and any bit having a logic low value, e.g., "0", is considered as being released. This convention may be reversed as those skilled in the art will understand.

The dirty bit D may include information indicating whether or not the cache data CDATA stored in a corresponding cache line is written back to the main memory 154. That is, the dirty bit D may include information about whether or not the cache data CDATA is different from data of the main memory 154. The dirty bit D may be set to the logic high value when the cache data CDATA needs to be written back to the main memory 154, and released to the logic low value when the cache data CATA stored in the corresponding cache line is written back to the main memory 154. For example, the dirty bit D may be set to the logic high value when the write operation is performed. When the dirty bit D is so set, the cache data CDATA may be stored only in the cache memory 152.

The loading bit L may include information indicating whether read data read from the main memory 154 shown in FIG. 1 in response to a read request is being loaded into a corresponding cache line. The loading bit L may be set to be a high bit when the read data of the main memory 154 is being loaded into the corresponding cache line, and released to the logic low value when the cache data CDATA is stored in the corresponding cache line after the loading is completed.

In the present embodiment, the memory controller 130 may manage the loading bit L and the valid bit V so as not to be set simultaneously. In other words, the memory controller 130 may manage the loading bit L and the valid bit V not to have logic high values simultaneously. The memory controller 130 may schedule an operation of the memory device 150 with reference to the tag address TAG_A, the valid bit V, the dirty bit D and the loading bit V that are stored in each cache line of the cache memory 152.

The memory controller 130 may search for a cache line having the tag address TAG_A corresponding to an address of the read data in response to the read request. When the cache line is found, that is, a cache hit occurs, the memory controller 130 may check whether or not the valid bit V or the loading bit L of the cache-hit cache line is set, and schedule the read operation of the memory device 150 according to the result of the check. Further description on this aspect are provided below with reference to FIG. 3.

The memory controller 130 may search for a cache line having the tag address TAG_A corresponding to an address of the write data in response to the write request. When the cache line is found, the memory controller 130 may check whether or not the valid bit V or the loading bit L of the cache-hit cache line is set, and schedule the write operation of the memory device 150 according to the result of check. Further description on this aspect are provided below with reference to FIG. 4.

When there is no loading bit L, as in the case in which the nonvolatile memory device such as a PCRAM having relatively long latency is used as the main memory, the following issue may occur.

In this example, first to fifth read requests R0, R1, R2, R3 and R4 related to addresses of 0x00, 0x01, 0x02, 0x03 and 0x00 are sequentially received. The memory controller 130 searches for a cache line having the tag address TAG_A corresponding to the address of 0x00 according to the first read request R0. If there is no cache-hit, that is, no cache line having TAG_A corresponding to 0x00, the memory controller 130 may secure an empty cache line of the cache memory 152 and request the main memory 154 for the read data assigned to the address of 0x00. In this case, the memory controller 130 may set the valid bit V of the secured cache line to logic high value.

Subsequently, after the second to fourth read requests R1, R2 and R3 relating to the addresses of 0x01, 0x02 and 0x03 are sequentially processed, the memory controller 130 searches for a cache line having the tag address TAG_A corresponding to the address of 0x00 according to the fifth read request R4. In this case, the memory controller 130 may determine that the cache data CDATA of the cache-hit cache line is valid since the processing of the first read request R0 related to the first-input address of 0x00 is completed, and directly provide the cache data CDATA of the corresponding cache line to the host. In actuality, however, due to the long latency of the main memory 154, the read data may not reach the cache memory 152 from the main memory 154, resulting in an ambiguous cache state that is neither a cache hit nor a cache miss.

In the present embodiment, it is possible to prevent the malfunction of the memory system and improve the performance of the memory system by scheduling an operation of the memory device 150 using the loading bit L indicating whether the read data read from the main memory 154 is being loaded into the corresponding cache line.

Figure 3:
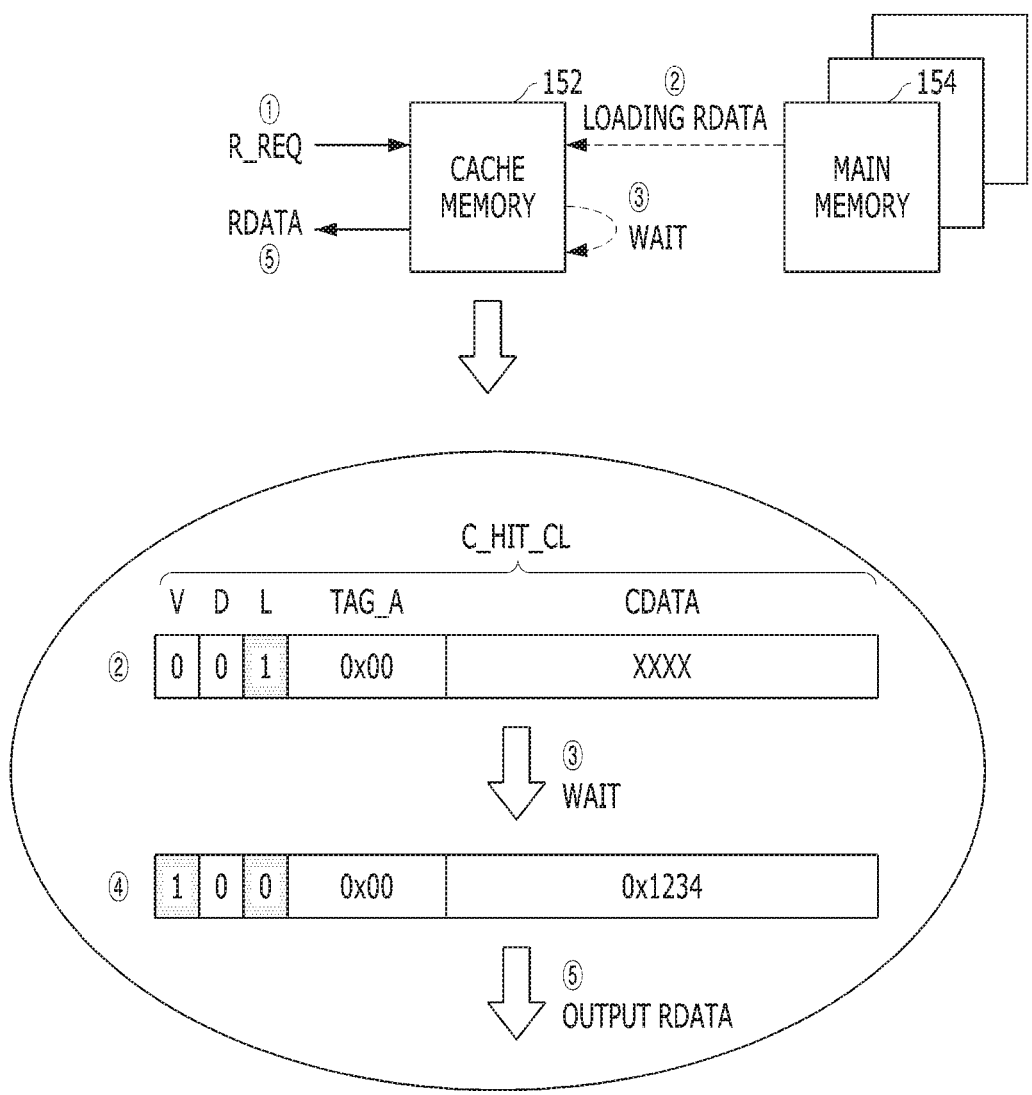
FIG. 3 is a diagram for describing an operation of a memory controller during a read operation when a loading bit is set in accordance with an embodiment of the present invention.

FIG. 3 is a diagram for describing an operation of the memory controller during a read operation when the loading bit L is set in accordance with an embodiment of the present invention. For clarity, FIG. 3 illustrates only the cache memory 152 and the main memory 154 of FIG. 1.

Referring to FIG. 3, when a read request R_REQ is received from the host (denoted "①" in FIG. 3), the memory controller 130 searches the cache memory 152 for a cache line having the tag address TAG_A corresponding to an address of the read data RDATA. In this case, when the loading bit L of a cache-hit cache line C_HIT_CL is set and the valid bit V is released (denoted "②" in FIG. 3), the memory controller 130 may determine that the read data RDATA is being loaded from the main memory 154 into the cache-hit cache line C_HIT_CL in response to the previous read request.

The memory controller 130 waits until the read data RDATA reaches the cache-hit cache line C_HIT_CL (denoted "③" in FIG. 3). Subsequently, when the read data RDATA reaches the cache-hit cache line C_HIT_CL and is stored as the cache data CDATA, the memory controller 130 may release the loading bit L and set the valid bit V (denoted "④" in FIG. 3), thereby notifying that the cache data CDATA of the cache-hit cache line C_HIT_CL is a valid value. The memory controller 130 may output the cache data CDATA of the cache-hit cache line C_HIT_CL to the host as the read data RDATA (denoted "⑤" in FIG. 3).

Although it is described above that the read data RDATA is outputted after the loading bit L is released and the valid bit V is set ("④" in FIG. 3), the present embodiment is not limited thereto. In some embodiments, the corresponding bits may be set ("④" in FIG. 3) after the read data RDATA is outputted ("⑤" in FIG. 3), and an operation of outputting the read data RDATA ("⑤" in FIG. 3) and an operation of setting the corresponding bits ("④" in FIG. 3) may be performed simultaneously.

Figure 4:
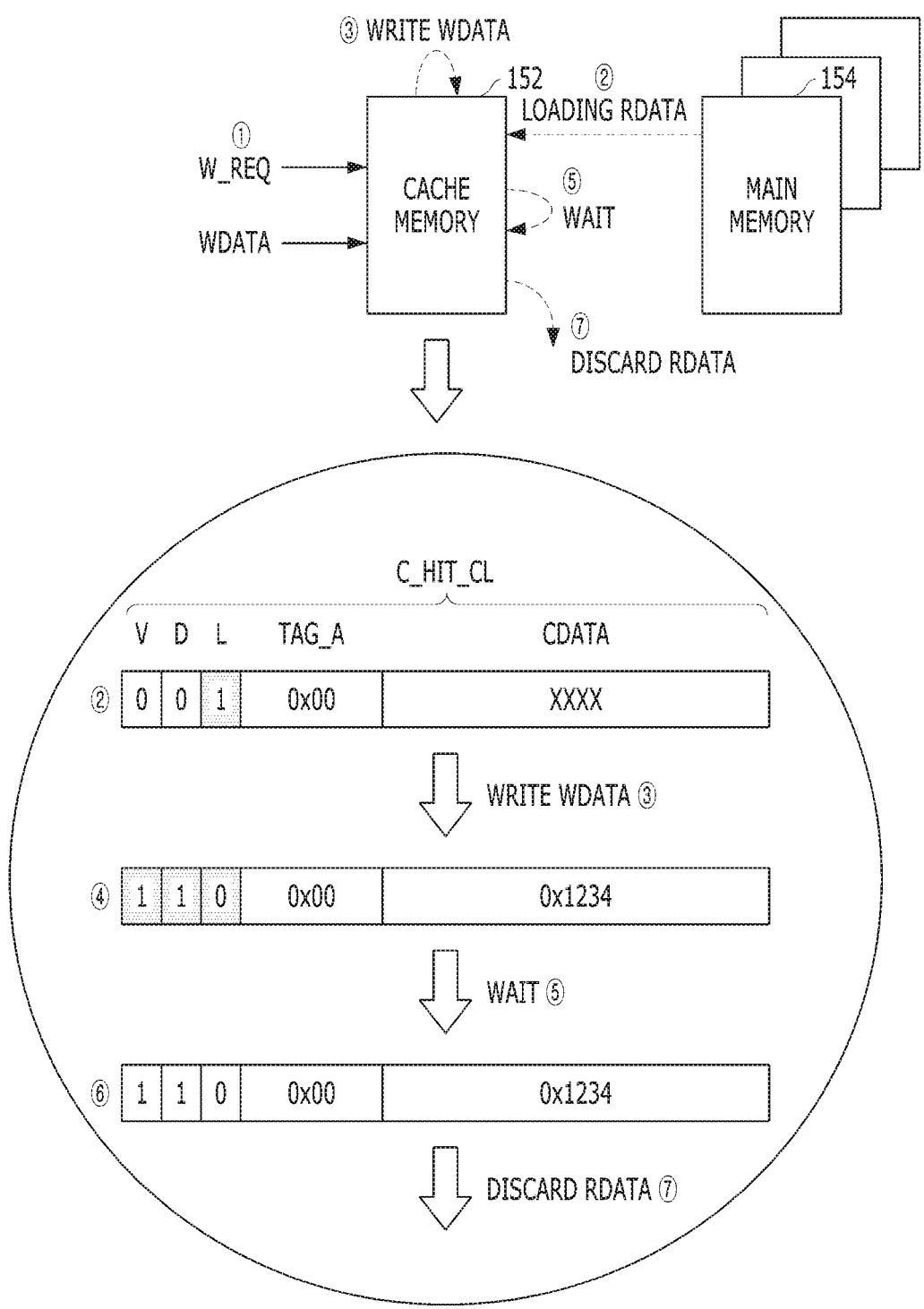
FIG. 4 is a diagram for describing an operation of a memory controller during a write operation when a loading bit is set in accordance with an embodiment of the present invention.

FIG. 4 is a diagram for describing an operation of the memory controller during a write operation when the loading bit L is set in accordance with an embodiment. For clarity, FIG. 4 illustrates only the cache memory 152 and the main memory 154 of FIG. 1.

Referring to FIG. 4, when a write request W_REQ is inputted from the host ("①" in FIG. 4), the memory controller 130 searches the cache memory 152 for a cache line having the tag address TAG_A corresponding to an address of the write data WDATA. In this case, when the loading bit L of a cache-hit cache line C_HIT_CL is set and the valid bit V is released ("②" in FIG. 4), the memory controller 130 may determine that the read data RDATA is being loaded from the main memory 154 into the cache-hit cache line C_HIT_CL in response to the previous read request.

The memory controller 130 may write the write data WDATA as the cache data CDATA of the cache-hit cache line C_HIT_CL ("③" in FIG. 4). The memory controller 130 may set the valid bit V and dirty bit D of the cache-hit cache line C_HIT_CL to logic high values and release the loading bit L to a logic low value ("④" in FIG. 4), thereby notifying that the cache data CDATA of the cache-hit cache line C_HIT_CL is a valid value but a different value from the data of the main memory 154. In this case, the memory controller 130 may manage the loading bit L and the valid bit V not to be logic high values simultaneously.

The memory controller 130 waits until the read data RDATA reaches the cache-hit cache line C_HIT_CL ("⑤" in FIG. 4). Subsequently, when the read data RDATA reaches the cache-hit cache line C_HIT_CL, the memory controller 130 may discard the read data RDATA ("⑦" in FIG. 4). In this case, the memory controller 130 may maintain the setting of the valid bit V, the dirty bit D and the loading bit L of the cache-hit cache line C_HIT_CL ("⑥" in FIG. 4).

Although it is described above that the valid bit V and the dirty bit D are set and the loading bit L is released ("④" in FIG. 4) after the write data WDATA is written ("③" in FIG. 4), the present embodiment is not limited thereto. In some embodiments, the write data WDATA may be written ("③" in FIG. 4) after the corresponding bits are set ("④" in FIG. 4), and an operation of writing the write data WDATA ("③" in the drawing) and an operation of setting the corresponding bits ("④" in FIG. 4) may be performed simultaneously.

As described above, in accordance with an embodiment, the hybrid memory system, which uses a nonvolatile memory having relatively long latency as the main memory and a DRAM as the cache memory, may manage data using the loading bit indicating whether the read data of the main memory is being loaded into the cache memory. Therefore, by scheduling an operation of the cache memory in an ambiguous state which is neither a cache hit nor a cache miss, it is possible to prevent malfunction of the memory system and improve the performance of the memory system.

Operations of the memory system will be described in detail with primary reference to FIGS. 5 and 6 as well as additional reference to FIGS. 1 to 4.

Figure 5:
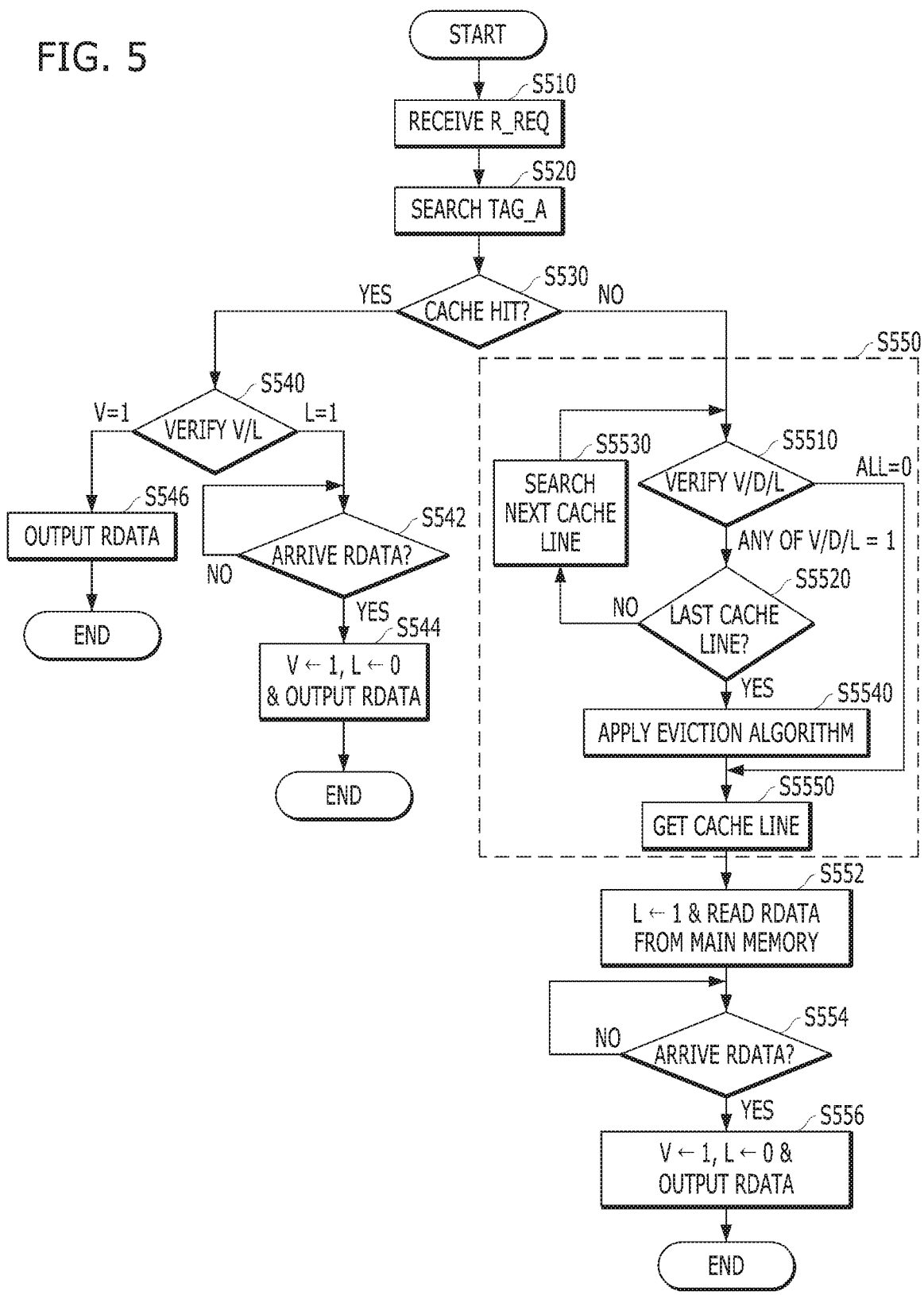
FIG. 5 is a flowchart for describing a read operation of a memory system in accordance with an embodiment of the present invention.

FIG. 5 is a flowchart for describing the read operation of the memory system in accordance with an embodiment of the present invention.

Referring to FIG. 5, when the read request R_REQ is received from the host in step S510, the memory controller 130 searches the cache memory 152 for a cache line having the tag address TAG_A corresponding to an address of the read data RDATA in step S520.

When there is a cache-hit, that is, such cache line C_HIT_CL is found ("YES" in step S530), the memory controller 130 may check the loading bit L and the valid bit V in step S540.

When the loading bit L of the cache-hit cache line C_HIT_CL is set to a logic high value (that is, "L=1" in step S540), the memory controller 130 may determine that the read data RDATA is being loaded from the main memory 154 into the cache-hit cache line C_HIT_CL according to the previous read request.

The memory controller 130 waits until the read data RDATA reaches the cache-hit cache line C_HIT_CL in step S542. Subsequently, when the read data RDATA reaches the cache-hit cache line C_HIT_CL and is stored as the cache data CDATA, the memory controller 130 may release the loading bit L to a logic low value, set the valid bit to a logic high value, and output the cache data CDATA of the cache-hit cache line C_HIT_CL to the host as the read data RDATA in step S544.

When the loading bit L of the cache-hit cache line C_HIT_CL is released to a logic low value and the valid bit V is set to a logic high value (that is, "V=1" in step S540), the memory controller 130 may output the cache data CDATA of the cache-hit cache line C_HIT_CL to the host as the read data RDATA and maintain the states of the current loading bit L and valid bit V in step S546.

When the cache-hit cache line C_HIT_CL is not found (that is, "NO" in step S530), that is, a cache miss occurs, the memory controller 130 may secure an empty cache line from the cache memory 152 in step S550. The memory controller 130 may search for the empty cache line based on the valid bit V, the dirty bit D and the loading bit L.

More specifically, the memory controller 130 may check the valid bit V, the dirty bit D and the loading bit L of each cache line of the cache memory 152 in step S5510. When the valid bit V, the dirty bit D and the loading bit L of one cache line are all released to logic low values (that is, "ALL=0" in step S5510), the memory controller 130 may obtain the corresponding cache line as the empty cache line in step S5550.

On the other hand, when any one of the valid bit V, the dirty bit D and the loading bit L of one cache line is set (that is, "ANY OF V/D/L=1" in step S5510), the memory controller 130 may determine that the corresponding cache line is an occupied cache line, and search for a next cache line in step S5530. When the corresponding cache line is the last cache line (that is, "YES" in step S5520), the memory controller 130 may determine that the cache memory 152 is cache-full, and select any one of the occupied cache lines by applying an eviction algorithm based on a cache replacement policy in step S5540. For example, the eviction algorithm may be carried out based on one of a First-In-First-Out (FIFO) list in which the oldest block loaded in the cache is replaced, a Least Frequently Used (LFU) list in which the least used block after being loaded into the cache is replaced, and a Least Recently Used (LRU) list in which the longest remaining block in the unused state after being loaded into the cache is replaced. The memory controller 130 may obtain the empty cache line by deleting cache data of a cache line selected according to the eviction algorithm or writing back the cache data to the main memory 154 in step S5550.

Subsequently, the memory controller 130 sets the loading bit L of the obtained cache line to a logic high value, and requests the main memory 154 of the read data RDATA corresponding to the read request in step S552. The memory controller 130 waits until the read data RDATA reaches the obtained cache line in step S554. Subsequently, when the read data RDATA reaches the obtained cache line and is stored as the cache data CDATA, the memory controller 130 may release the loading bit L to a logic low value, set the valid bit V to a logic high value, and output the cache data CDATA of the obtained cache line to the host as the read data RDATA in step S556.

Figure 6:
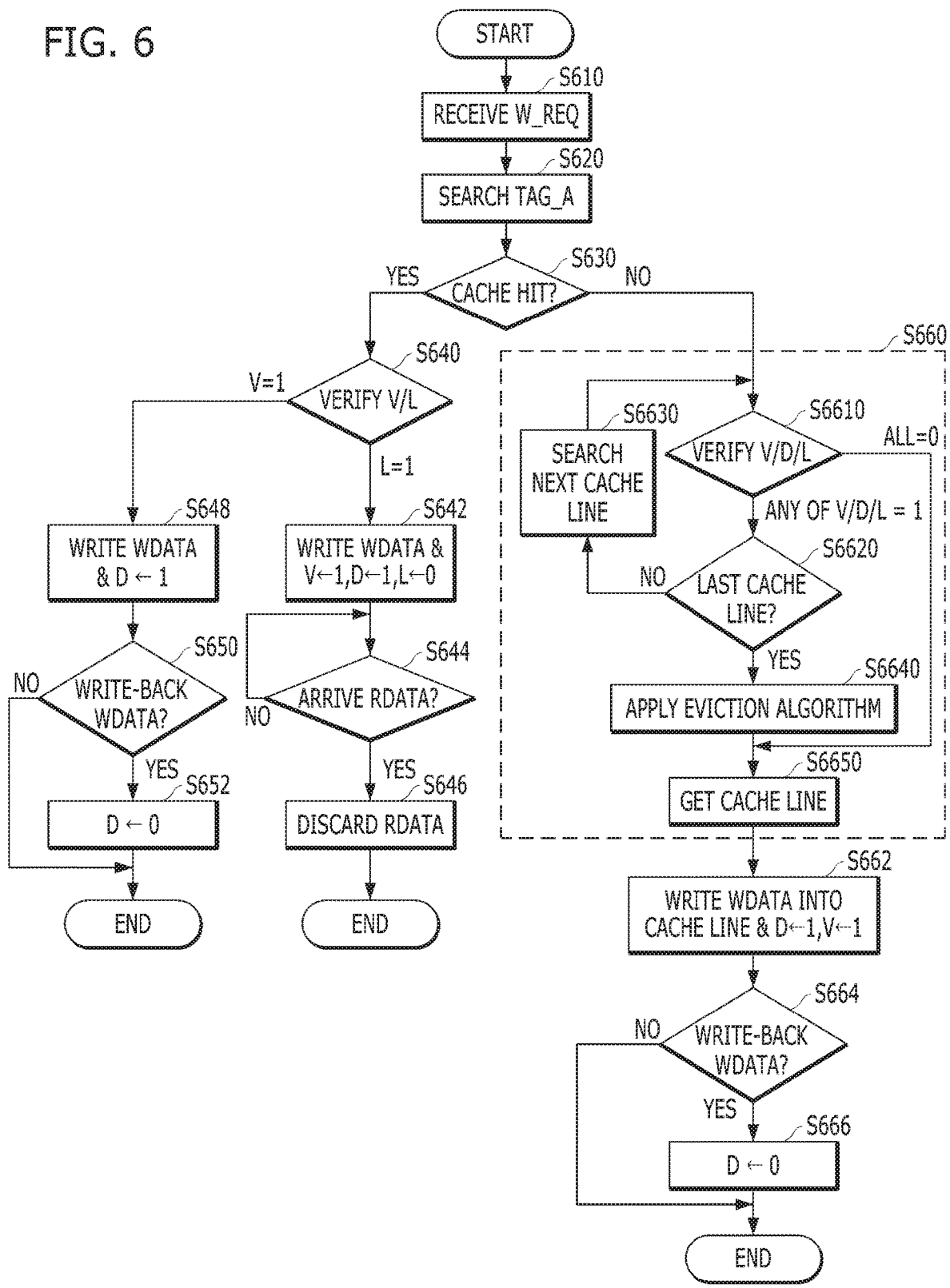
FIG. 6 is a flowchart for describing a write operation of a memory system in accordance with an embodiment of the present invention.

FIG. 6 is a flowchart for describing the write operation of the memory system in accordance with an embodiment.

Referring to FIG. 6, when the write request W_REQ is received from the host in step S610, the memory controller 130 searches the cache memory 152 for a cache line having the tag address TAG_A corresponding to an address of the write data WDATA in step S620.

When there is a cache-hit, that is, cache line C_HIT_CL is found ("YES" in step S630), the memory controller 130 may check the loading bit L and the valid bit V in step S640.

When the loading bit L of the cache-hit cache line C_HIT_CL is set to a logic high value (that is, "L=1" in step S640), the memory controller 130 may determine that the read data RDATA is being loaded from the main memory 154 into the cache-hit cache line C_HIT_CL according to the previous read request.

The memory controller 130 writes the write data WDATA as the cache data CDATA of the cache-hit cache line C_HIT_CL, and sets the valid bit V and the dirty bit D of the cache-hit cache line C_HIT_CL to logic high values and releases the loading bit L to a logic low value in step S642. In this case, the fact that the dirty bit D is changed to a logic high value means that new data is stored in the cache memory 152 and a write operation for the new data is not performed on the main memory 154.

The memory controller 130 waits until the read data RDATA reaches the cache-hit cache line C_HIT_CL in step S644. Subsequently, when the read data RDATA reaches the cache-hit cache line C_HIT_CL, the memory controller 130 may discard the read data RDATA in step S646. At this time, the memory controller 130 may maintain the setting of the valid bit V, the dirty bit D and the loading bit L of the cache-hit cache line C_HIT_CL.

When the loading bit L of the cache-hit cache line C_HIT_CL is released to a logic low value and the valid bit V is set to a logic high value (that is, "V=1" in step S640), the memory controller 130 may store the write data WDATA as the cache data CDATA of the cache-hit cache line C_HIT_CL, set the dirty bit D to a logic high value, and maintain the set state of the valid bit V in step S648.

Subsequently, when the cache memory 152 is cache-full so that a selected cache line is evicted according to the cache replacement policy or a write-back request is received from the host (that is, "YES" in step S650), the memory controller 130 may write back the cache data CDATA of the cache line in which the dirty bit D is set to the main memory 154, and release the dirty bit D to a logic low value in step S652. As described above, after such a write-back operation is performed, the memory controller 130 may release the dirty bit D to notify that coherency between the cache memory 152 and the main memory 154 is maintained.

When the cache-hit cache line C_HIT_CL is not found (that is, "NO" in step S630), that is, a cache miss occurs, the memory controller 130 may secure an empty cache line from the cache memory 152 in step S660. The memory controller 130 may search for the empty cache line based on the valid bit V, the dirty bit D and the loading bit L.

More specifically, the memory controller 130 may check the valid bit V, the dirty bit D and the loading bit L of each cache line of the cache memory 152 in step S6610. When the valid bit V, the dirty bit D and the loading bit L of a single cache line are all released to logic low values (that is, "ALL=0" in step S6610), the memory controller 130 may obtain the corresponding cache line as the empty cache line in step S6650.

On the other hand, when any one of the valid bit V, the dirty bit D and the loading bit L of one cache line is set (that is, "ANY OF V/D/L=1" in step S6610), the memory controller 130 may determine that the corresponding cache line is an occupied cache line, and search for a next cache line in step S6630. When the corresponding cache line is the last cache line (that is, "YES" in step S6620), the memory controller 130 may determine that the cache memory 152 is cache-full, and select any one of the occupied cache lines by applying an eviction algorithm based on the cache replacement policy in step S6640. The memory controller 130 may obtain the empty cache line by deleting cache data of a cache line selected according to the eviction algorithm or writing back the cache data to the main memory 154 in step S6650.

The memory controller 130 may store the write data WDATA as the cache data CDATA of the obtained cache line, and set the dirty bit D and the valid bit V to logic high bits in step S662.

Subsequently, when the cache memory 152 is cache-full so that a selected cache line is evicted according to the cache replacement policy or a write-back request is inputted from the host (that is, "YES" in step S664), the memory controller 130 may write back the cache data CDATA of the cache line in which the dirty bit D is set to the main memory 154, and release the dirty bit D to a logic low value in step S666.

As is apparent from the above description, in the memory system according to embodiments, by scheduling an operation of a cache memory in an ambiguous state that is neither a cache hit nor a cache miss, malfunction of the memory system may be prevented and performance of the memory system may be improved.

While the present disclosure has been illustrated and described with respect to specific embodiments, the embodiments are not intended to be restrictive, but rather descriptive. Further, it is noted that the present disclosure may be achieved in various ways through substitution, change, and modification, as understood by those skilled in the art in light of the present disclosure, without departing from the spirit and/or scope of the present disclosure as defined by the following claims.

What is claimed is:

1. A memory system comprising:
 a memory device including a main memory and a cache memory that includes a plurality of cache lines for caching data stored in the main memory, wherein each of the cache lines includes cache data, a valid bit indicating whether or not the corresponding cache data is valid, and a loading bit indicating whether or not read data of the main memory is being loaded; and a memory controller suitable for scheduling an operation of the memory device with reference to the valid bits and the loading bits, wherein the memory controller manages the loading bit and the valid bit not to be set simultaneously.

2. The memory system of claim 1, wherein, when the loading bit of a cache-hit cache line, which corresponds to an address of the read data, is set during a read operation, the memory controller waits until the read data is stored in the cache-hit cache line, and then releases the loading bit, sets the valid bit, and outputs the cache data of the cache-hit cache line.

3. The memory system of claim 1, wherein, when the valid bit of a cache-hit cache line, which corresponds to an address of the read data, is set during a read operation, the memory controller outputs the cache data of the cache-hit cache line.

4. The memory system of claim 1, wherein, when the loading bit of a cache line, which corresponds to an address of select data to be stored therein, is set during a write operation, the memory controller stores write data as the cache data of the cache-hit cache line, sets the valid bit, and releases the loading bit, and discards the read data when the read data reaches the cache-hit cache line.

5. The memory system of claim 1, wherein, when the valid bit of a cache line, which corresponds to an address of write data to be stored therein, is set during a write operation, the memory controller stores the write data as the cache data of the cache-hit cache line, and maintains the set state of the valid bit.

6. The memory system of claim 1, wherein each of the cache lines further includes a tag address designating a storage location of the corresponding cache data,
wherein the memory controller searches for a cache line, which corresponds to an address of select data to be stored therein, based on the tag address in each of the cache lines.

7. The memory system of claim 1, wherein each of the cache lines further includes a dirty bit indicating whether there is a discrepancy between the corresponding cache data and the data of the main memory.

8. A memory system comprising:
a nonvolatile memory device;
a volatile memory device including a plurality of cache lines for caching data stored in the nonvolatile memory device, wherein each of the cache lines includes cache data, a tag address, a valid bit indicating whether or not the corresponding cache data is valid, a dirty bit indicating whether there is a discrepancy between the corresponding cache data and the data of the nonvolatile memory device, and a loading bit indicating whether or not read data of the nonvolatile memory device is being loaded; and
a memory controller suitable for scheduling an operation of the volatile memory device with reference to the valid bits, the dirty bits and the loading bits, wherein the memory controller manages the loading bit and the valid bit not to be set simultaneously.

9. The memory system of claim 8, wherein the memory controller searches for a cache line, which corresponds to an address of select data to be stored therein, based on the tag address.

10. The memory system of claim 9, wherein, when the loading bit of the cache-hit cache line is set during a read operation, the memory controller waits until the read data is stored in the cache-hit cache line, and then releases the loading bit, sets the valid bit, and outputs the cache data of the cache-hit cache line.

11. The memory system of claim 9, wherein, when the valid bit of the cache-hit cache line is set during a read operation, the memory controller outputs the cache data of the cache-hit cache line.

12. The memory system of claim 9, wherein, when the loading bit of the cache-hit cache line is set during a write operation, the memory controller stores write data as the cache data of the cache-hit cache line, sets the dirty bit and the valid bit, and releases the loading bit, and discards the read data when the read data reaches the cache-hit cache line.

13. The memory system of claim 9, wherein, when the valid bit of the cache-hit cache line is set during a write operation, the memory controller stores write data as the cache data of the cache-hit cache line, sets the dirty bit, and maintains the set state of the valid bit.

14. An operating method of a memory system, comprising:
providing a memory device including a main memory and a cache memory that includes a plurality of cache lines for caching data stored in the main memory, wherein each of the cache lines includes cache data, a valid bit indicating whether or not the corresponding cache data is valid, and a loading bit indicating whether or not read data of the main memory is being loaded;
checking whether or not the loading bit of a cache line, which corresponds to an address of select data to be stored therein, is set when a read request is received from a host; and
managing the loading bit and the valid bit not to be set simultaneously by releasing the loading bit while setting the valid bit, and outputting the cache data of the cache-hit cache line after waiting until the read data is stored in the cache-hit cache line, when the loading bit is set.

15. The operating method of claim 14, further comprising:
outputting the cache data of the cache line when the loading bit of the cache-hit cache line is released and the valid bit is set in response to the read request.

16. The operating method of claim 14, wherein each of the cache lines further includes a dirty bit indicating a discrepancy between the corresponding cache data and the data of the main memory.

17. The operating method of claim 16, further comprising:
checking whether or not the loading bit of the cache-hit cache line is set when a write request is received from the host;
storing write data as the cache data of the cache line, setting the dirty bit and the valid bit, and releasing the loading bit, when the loading bit is set; and
discarding the read data when the read data reaches the cache line.

18. The operating method of claim 17, further comprising:
storing the write data as the cache data of the cache line, setting the dirty bit, and maintaining a set state of the valid bit, when the loading bit of the cache-hit cache line is released and the valid bit is set in response to the write request.

19. The operating method of claim 16, wherein each of the cache lines further includes a tag address designating a storage location of the corresponding cache data,
wherein the operating method further comprises:
searching for the cache-hit cache line based on the tag address in each of the cache lines.

20. The operating method of claim 19, further comprising:
searching for an empty cache line based on the valid bit, the dirty bit and the loading bit, when the cache-hit cache line is not found; and
obtaining an empty cache line according to a cache replacement policy when the empty cache line is not found.

21. The operating method of claim 20, further comprising:
when the cache-hit cache line is not found in response to the read request,
requesting the read data from the main memory and setting the loading bit; and
releasing the loading bit, setting the valid bit, and outputting cache data of the obtained cache line, after waiting until the read data is stored in the obtained cache line.

22. The operating method of claim 20, further comprising:
storing write data as the cache data of the obtained cache line and setting the dirty bit and the valid bit of the obtained cache line, when the cache-hit cache line is not found in response to a write request.

23. The operating method of claim 22, further comprising:
writing back the cache data of the cache line in which the dirty bit is set to the main memory and releasing the dirty bit.

* * * * *